Feb. 28, 1961  J. KABACI  2,973,115
COFFEE CAN OPENER
Filed May 31, 1960
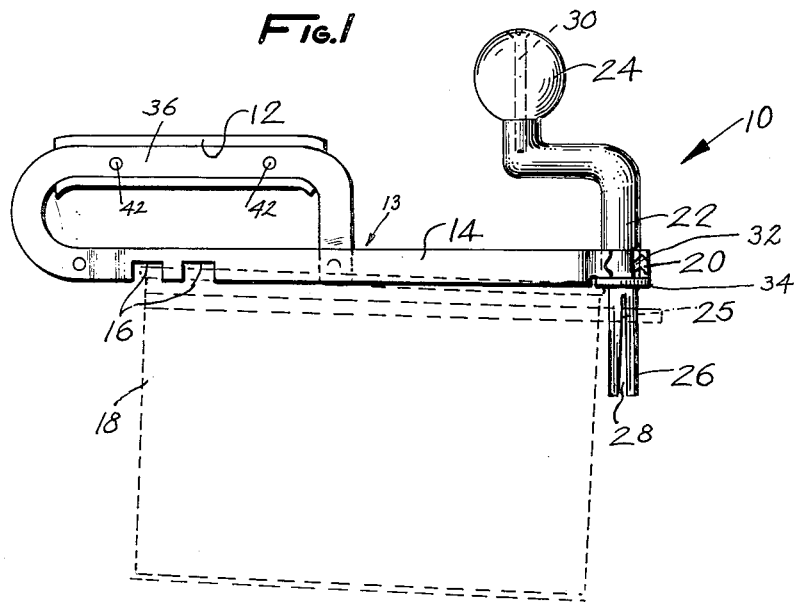
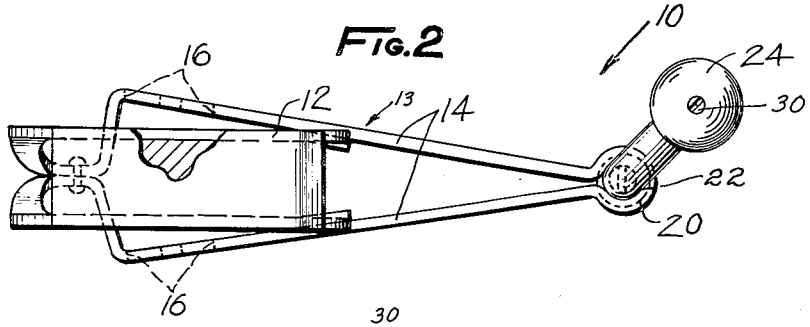
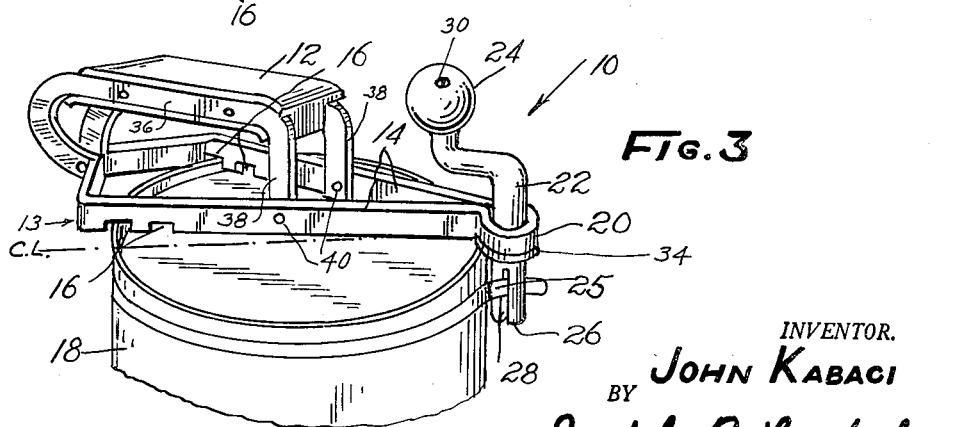
INVENTOR.
BY John Kabaci
Joseph B. Lindecker
ATT'Y.

United States Patent Office 2,973,115
Patented Feb. 28, 1961

2,973,115

COFFEE CAN OPENER

John Kabaci, Box 594, Idyllwild, Calif.

Filed May 31, 1960, Ser. No. 33,035

5 Claims. (Cl. 220—52)

This invention relates to can openers, and, more particularly, to a special purpose coffee can opener.

It is an object of the present invention to provide a manually operated device for removing the metal bands from coffee cans in a simple and convenient manner, the coffee cans being provided with a tear strip extending around the same a short distance from the top, the strip having an exposed free end to which a key may be applied to tear the strip loose and wind it up, to open the can.

Another object of the present invention is to provide a coffee can opener of the above type which will allow such coffee cans to be opened in a safe and effective manner, and which will allow for the rapid disposal of the strip removed from the coffee can.

Other objects of the invention are to provide a coffee can opener bearing the above objects in mind, which is of simple construction, has a minimum number of parts, is inexpensive to manufacture, and efficient in operation.

For other objects and for a better understanding of the invention, reference may be had to the following detailed description, taken in conjunction with the accompanying drawing, in which:

Figure 1 is a side elevational view, partly in section, of a coffee can opener made in accordance with the present invention in actual use upon a can, the can shown dotted;

Figure 2 is a top plan view, with parts broken away, of the invention shown in Figure 1; and Figure 3 is a perspective view of the can opener in use upon a can, the lower portion of the can broken away.

Referring now more in detail to the drawing, a coffee can opener 10 made in accordance with the present invention is shown to include a main rectangular-shaped handle 12 mounted upon and adjacent the outer end of a main frame 13 consisting of a pair of horizontally diverging arms 14 that form a tubular, vertical bearing ring 20 at their opposite, converging ends. The lower portion of the frame members 14, directly beneath the handle 12, is quadrilateral in shape and is provided with a pair of spaced apart slots 16 in each arm of the outer end thereof for slidably receiving the upper rim of a coffee can 18 during use, in a manner hereinafter more fully described.

The frame 13 is formed from one continuous bar of metal stock, rectangular in cross-section. The bar is bent to form a bearing ring 20 at its mid-section, said ring 20 being reduced in height by having its lower edge cut away. A cylindrical vertical thrust bearing 32 is assembled within the bearing ring 20 with a circular collar 34 replacing the cut out portion therein, the lower side of the collar being in a horizontal plane extending through the lower edge of said arms 14. A cylindrical bearing and a washer may be substituted for the thrust bearing 32 if so desired. The outer ends of the arms 14 are formed inwardly towards each other, then bent upwardly a suitable distance, then bent forwardly forming horizontal main-handle support members 36, then the remaining free end portions 38 extend downwardly and the free ends pinned, or otherwise secured to the arms 14 and normal thereto, by pin 40 or the like. The main-handle is an elongated rectangular block 12 with longitudinal channeled side edge portions which allow the support members 36 to be assembled therein and secured by pins 42.

A rigid crank shaft 22 is rotatably and vertically mounted within the thrust bearing 32 at the end of the main frame opposite the handle 12. The upper end of the crank shaft 22 is provided with a vertical crank portion with a handle 24 rotatably mounted thereon by a screw 30 extending through a vertical bore therein, whereas the opposite lower end of this shaft 22 includes a mounting member 26 having an inverted V-shaped, downwardly open slot 28, called a cannister sealing strip slot, within which the free end of the coffee can band to be removed from the coffee can 18 may be inserted.

It will now be recognized that in actual use, the frame 14 is placed upon the top of the coffee can 18, to one side of the transverse center line, in the manner shown by Figures 1 and 3 and with the sealing strip inserted into the inverted V-shaped slot 28 in the lower portion of the crank shaft 22. Then, depending upon the size of the can, the opposite side of the can is engaged with the main frame by allowing the upper rim thereof to be received within the closest fitting set of slots 16. The slots are just large enough to freely receive the rim of the can therein. After the device has been properly positioned, the handle 24 may be rotated, during which time the band 25 will be wound upon the wind-up section 26 of the shaft 22 as it is removed from the periphery of the can 18, during which time the can 18 will rotate freely beneath the main frame members 14. After the strip 25 has been completely removed from the can, it may be conveniently removed from the wind-up section 26 of the shaft 22 by exerting a downward or outward pressure thereupon.

While various changes may be made in the detail construction, it shall be understood that such changes shall be within the spirit and scope of the present invention, as defined by the appended claims.

What I claim as new and desire to protect by Letters Patent of the United States is:

1. An implement for opening a can of the type that consists of a cup-shaped body with a skirt equipped cover by removing the tear strip extending around the can a short distance below a peripheral rim rising above the top of the cover, comprising: a main frame formed of a single length of metal stock rectangular in cross-section, and embodying a pair of horizontally diverging arms adapted to overlie such a can and can cover and rest on said rim, the arms having their inner converging end portions thereof connected together by a circular mid-portion of said metal stock forming a vertically extending cylindrical bearing ring that is adapted when the pair of arms are in place across the top of the can cover to assume a position wherein it is substantially above and outwardly of the rim of the can cover, the outer diverging end portions of said arms being bent inwardly towards each other and upwardly a suitable distance and then toward the coverging ends of said arms forming a pair of horizontal longitudinal main-handle support members arranged above said arms, the remaining free end portions thereof being bent downwardly with the free ends thereof secured to the intermediate portions of said arms, a main-handle secured to and between said longitudinal main-handle support members, and a vertically extending shaft having the central portion thereof journalled in said bearing ring, embodying in its lower end a diametric slot for receiving the tongue of the tear strip of the can, having the upper end thereof provided with turning means, and adapted when it is turned by said means after insertion of the tongue into the slot to wind the tear strip around its lower end and thus effect release of the cover of the can from the can body.

2. As a new article of manufacture, a device adapted to open a can of the type that consists of a cup-shaped body, a skirt equipped cover having an upstanding peripheral rim, and a tongue equipped removable tear strip between the upper end of the side wall of the body and the lower end of the skirt of the cover, and comprising a horizontally elongated main frame formed of a single length of metal stock of rectangular cross-section, and embodying a pair of horizontal diverging arms adapted in connection with use of the device to be placed in a horizontal position across the top wall of the cover of the can, said arms having their inner converging end portions thereof connected together by a circular midportion of said metal stock forming a vertically extending cylindrical bearing ring that is adapted when the pair of arms are in place across the top of the can cover to assume a position wherein it is substantially above and outwardly of the rim of the can cover, the outer diverging end portions of said arms being bent inwardly towards each other and upwardly a short distance and then toward the converging ends of said arms forming a pair of horizontal longitudinal main-handle support members arranged above said arms, the remaining free end portions thereof being bent downwardly with the free ends thereof pinned to the intermediate portions of said arms, a rectangular shaped main-handle secured to and between said longitudinal main-support members, and a vertically extending shaft having the central portion thereof journalled in said bearing ring, embodying in its lower end a diametric slot for receiving the tongue of the tear strip of the can, the upper end of said shaft having a crank portion defining a handle for effecting rotation of the shaft, and adapted when it is turned by said handle after insertion of the tongue into the slot to wind the tear strip around its lower end and thus effect release of the cover of the can from the can body.

3. The device as set forth in claim 2 wherein the underside surface of the outer end portions of said horizontal diverging arms are each provided with a transverse slot defining a can cover rim track.

4. The device as set forth in claim 2 wherein the under surface of the outer end portions of said horizontal diverging arms are each provided with a plurality of transverse slots defining selective can cover rim tracks, for use with cans of various diameters.

5. The device as set forth in claim 4 wherein the lower end of said bearing ring is provided with a cut-out portion, a thrust bearing arranged within said bearing ring with an enlarged head portion arranged within said cut-out portion, whereby the lower surface of said enlarged head portion will rest upon the rim of said can cover while said handle is being turned.

References Cited in the file of this patent

UNITED STATES PATENTS

| | | |
|---|---|---|
| 2,588,244 | Johanson | Mar. 4, 1952 |
| 2,625,294 | Bodin et al. | Jan. 13, 1953 |
| 2,730,729 | Coplen | Jan. 17, 1956 |
| 2,734,655 | Carlson et al. | Feb. 14, 1956 |
| 2,799,428 | Barker | July 16, 1957 |
| 2,809,765 | De Fazio | Oct. 15, 1957 |